United States Patent
Rumpf et al.

(10) Patent No.: US 6,628,851 B1
(45) Date of Patent: Sep. 30, 2003

(54) MEMS RECONFIGURABLE OPTICAL GRATING

(75) Inventors: Raymond C. Rumpf, Melbourne, FL (US); Charles M. Newton, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 157 days.

(21) Appl. No.: 09/739,013

(22) Filed: Dec. 20, 2000

(51) Int. Cl.[7] .............................................. G02F 1/295
(52) U.S. Cl. .............................. 385/10; 385/14; 385/31; 385/37
(58) Field of Search ............................ 385/10, 37, 31, 385/24, 14; 372/9, 20, 102

(56) References Cited

U.S. PATENT DOCUMENTS

| | | | |
|---|---|---|---|
| 5,440,581 A | 8/1995 | Ono et al. | 372/96 |
| 5,581,572 A * | 12/1996 | Delorme et al. | 372/50 |
| 5,682,445 A * | 10/1997 | Smith | 385/7 |
| 5,699,468 A * | 12/1997 | Farries et al. | 385/140 |
| 5,706,375 A * | 1/1998 | Mihailov et al. | 385/24 |
| 5,757,536 A | 5/1998 | Ricco et al. | 359/224 |
| 5,781,341 A | 7/1998 | Lee | 359/578 |
| 5,808,384 A * | 9/1998 | Tabat et al. | 310/40 MM |
| 5,960,131 A | 9/1999 | Fouquet et al. | 385/17 |
| 5,962,949 A | 10/1999 | Dhuler et al. | 310/307 |
| 5,974,207 A | 10/1999 | Aksyuk et al. | 385/24 |
| 5,999,319 A | 12/1999 | Castracane | 359/573 |
| 6,011,881 A | 1/2000 | Moslehi et al. | 385/10 |
| 6,035,080 A | 3/2000 | Henry et al. | 385/24 |
| 6,097,859 A | 8/2000 | Solgaard et al. | 385/17 |
| 6,122,095 A | 9/2000 | Fatehi | 359/337 |
| 6,124,663 A | 9/2000 | Haake et al. | 310/307 |
| 6,127,908 A | 10/2000 | Bozler et al. | 333/246 |
| 6,128,961 A | 10/2000 | Haronian | 73/774 |
| 6,146,543 A | 11/2000 | Tai et al. | 216/2 |
| 6,154,471 A * | 11/2000 | Jin et al. | 372/20 |
| 6,282,340 B1 * | 8/2001 | Nasu et al. | 385/37 |
| 6,363,183 B1 * | 3/2002 | Koh | 385/19 |
| 6,396,855 B1 * | 5/2002 | Tam et al. | 372/20 |
| 2002/0003925 A1 * | 1/2002 | Little et al. | 385/37 |

FOREIGN PATENT DOCUMENTS

| | | | |
|---|---|---|---|
| EP | 0 486 356 | 11/1991 | G02F/1/11 |
| EP | 0 989 437 | 3/2000 | G02F/1/01 |
| WO | 97/31289 | 8/1997 | G02F/1/01 |
| WO | 01/88582 | 11/2001 | G02B/6/34 |

OTHER PUBLICATIONS

Zhang, et al., "A MEMS Pitch–Tunable Grating Add/Drop Mulitplexers," IEEE/LEOS International Conference on Optical MEMS, Aug. 2000, pp. 25–26.

Butler, et al., "A MEMS–Based Programmable Diffraction Grating for Optical Holography in the Spectral Domain," International Electron Devices Meeting 2001, Technical Digest, Dec. 2001, pp. 909–912.

Burns, et al., "Development of Microelectromechanical Variable Blaze Gratings," Sensors and Actuators, vol. 64, No. 1, 1998, pp. 7–15.

* cited by examiner

Primary Examiner—Rodney Bovernick
Assistant Examiner—Juliana K. Kang
(74) Attorney, Agent, or Firm—Allen, Dyer, Doppelt, Milbrath & Gilchrist, P.A.

(57) ABSTRACT

A tunable grating apparatus includes a plurality of grating structures contained within an optical transmission path. A microelectromechanical (MEMS) actuator is operatively connected to each grating structure for changing the separation between the grating structures and tuning the grating to a desired wavelength selectivity. The grating structures preferably form a Bragg grating.

26 Claims, 5 Drawing Sheets

MEMS RECONFIGURABLE OPTICAL GRATING

FIELD OF THE INVENTION

This invention relates to optical diffraction and reflection gratings, and more particularly, this invention relates to Bragg gratings.

BACKGROUND OF THE INVENTION

Bragg gratings and similar fiber optic and other optical grating structures are produced in glass, plastic or silicon to spread out an optical spectrum or other radiation. These gratings usually consist of narrow, parallel slits or narrow, parallel, reflecting surfaces that break-up waves as they emerge.

As is well known, light of all wavelengths is scattered at all angles. At some angles, however, light adds constructively at one wavelength, while other wavelengths add destructively (or interfere with each other), reducing the light intensity to zero or close to zero. In those ranges of angles where the grating spreads out a spectrum, there can be a gradual change in wavelength of the angle. With multiple grooves formed in a grating, light is concentrated in particular directions, and can be used as optical filters with other similar optical devices.

One commonly used optical grating is a Bragg grating used as a periodic grating, a chirped grating, a distributed feedback or distributed Bragg reflector grating (DFF or DBR), such as with laser, and a Fabry-Perot Etalon grating for a ring resonator as designed for use with add/drop multiplexers and similar optical devices. A Bragg grating is the optical equivalent of a surface acoustic wave (SAW) device. By having a tuned grating, there can be some compensation for dispersion conditions. Some optical filters use Bragg gratings that are tuned during fabrication, temperature tuned, or compression/strained tuned.

Prior art solutions for tuning gratings using temperature or compression/strain methods have a limited tuning range of typically only tens of nanometers maximum with a slow operation of tuning. As is known, the temperature and strain changes on Bragg deflection and change are set forth as:

$$\Delta \lambda_{BRAGG} = k_T \Delta T + k_\sigma \Delta \sigma$$

Also, multiple configurations are typically not possible in a single prior art device.

SUMMARY OF THE INVENTION

It is therefore an object of the present invention to provide tunable optical gratings that do not involve the tuning of the gratings using temperature or strain changes.

It is still another object of the present invention to provide a tunable optical grating where the grating profile can be controlled over a wide range, such as in hundreds of nanometers.

It is still another object of the present invention to provide a tunable optical grating having multiple configurations possible with a single device.

The present invention is advantageous and provides a tunable optical grating having a plurality of grating structures that are contained within an optical transmission path. A microelectromechanical (MEMS) actuator is operatively connected to each grating structure for changing the separation between the grating structures and tuning the grating to a desired wavelength selectivity.

In one aspect of the present invention, the grating structures form a Bragg grating and are periodic gratings. In yet another aspect of the present invention, the grating structures form a chirped grating. In still another aspect of the present invention, the grating structures can be a distributed feedback grating, distributed Bragg reflector grating, or a Fabry-Perot Etalon add/drop grating structure.

The Bragg or other grating can be formed on a silicon MEMS substrate. Formed MEMS actuators operatively connect each grating structure. The MEMS actuators can be photolithographically formed on the MEMS substrate or by other MEMS fabrication techniques, known to those skilled in the art. In yet another aspect of the present invention, the MEMS actuators can each comprise a flat, single layer silicon membrane structure.

In another aspect of the present invention, the MEMS actuators can each comprise at least one anchor support, and an arm member operatively connected to a grating structure, supported by the anchor support, and moveable therewith for moving the grating structure relative to another grating structure. The MEMS actuators also can comprise a hinged plate actuator operatively connected to each grating structure.

A tunable grating apparatus of the present invention can also comprise an optical waveguide defining an input port through which an optical signal is formed, such as a multi-wavelength optical signal, which passes through the grating structures. An optical waveguide can define an output port for receiving the optical signal from the grating structures. A collimating lens can be operatively connected to the input port to form a collimated optical signal. A converging lens can be operatively connected to the output port to converge the optical signal, all by techniques using lenses known to those skilled in the art.

In yet another aspect of the present invention, a tunable, add/drop optical network element includes an input port for receiving a multi-wavelength, optical signal and passing the optical signal along an optical transmission path. An output port receives the optical signal along the optical transmission path and passes the multi-wavelength optical signal with added or dropped optical signal channel components. An optical add/drop element is contained within the optical transmission path and includes a plurality of Bragg grating structures contained within the optical transmission path and forming a Bragg grating for receiving the optical signal and passing and/or reflecting optical signal channel components of a desired wavelength. A microelectromechanical (MEMS) actuator is operatively connected to each Bragg grating structure for changing the separation between the Bragg grating structures and tuning the Bragg grating to a desired wavelength selectivity.

In yet another aspect of the present invention, add and drop ports are operatively connected to the optical add/drop element, where optical signal channel components of desired wavelength are added and dropped. The Bragg grating structures are preferably configurable to be responsive to different optical signal channel components.

In yet another aspect of the present invention, a tunable laser and filter apparatus includes a semiconductor substrate and a laser structure formed on the semiconductor substrate. The laser structure includes an active layer and a plurality of Bragg grating structures formed along the active layer to form a Bragg grating and provide optical reflections at a desired Bragg wavelength. A microelectromechanical (MEMS) actuator is operatively connected to each Bragg grating structure for changing the separation between the Bragg grating structures and tuning the Bragg grating to a desired wavelength selectivity and limiting the laser output to a selected narrow band mode.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides a tunable grating, and more particularly, a tunable Bragg grating, using microelectromechanical (MEMS) actuators that are able to tune the grating over a much wider range, such as hundreds of nanometers. The present invention also allows multiple configurations within a single device.

Figure 1:
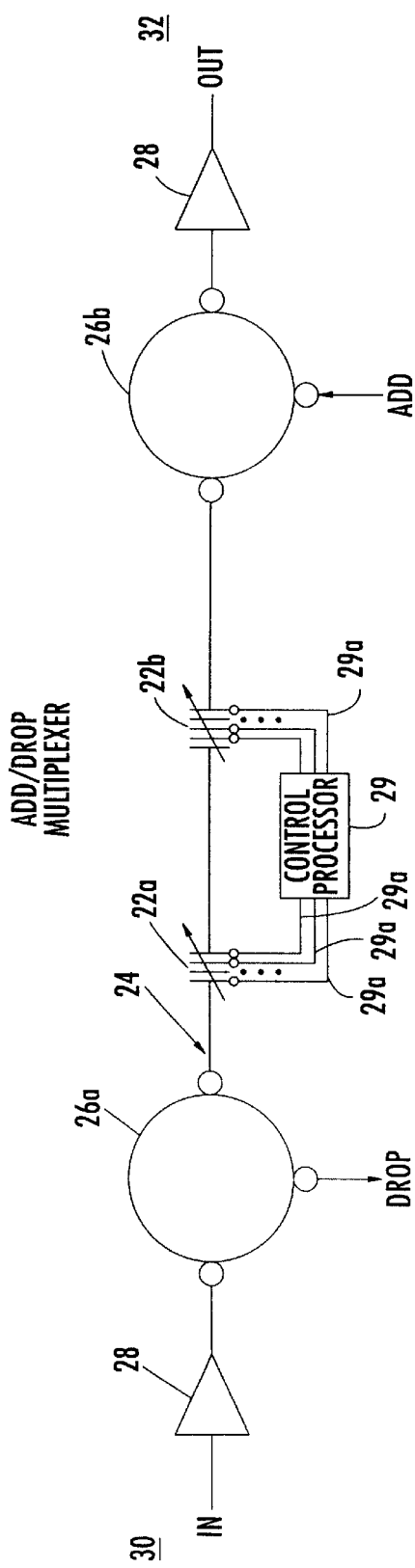
FIG. 1 is an example of a tunable optical grating of the present invention used in an add/drop multiplexer.
Figure 2:
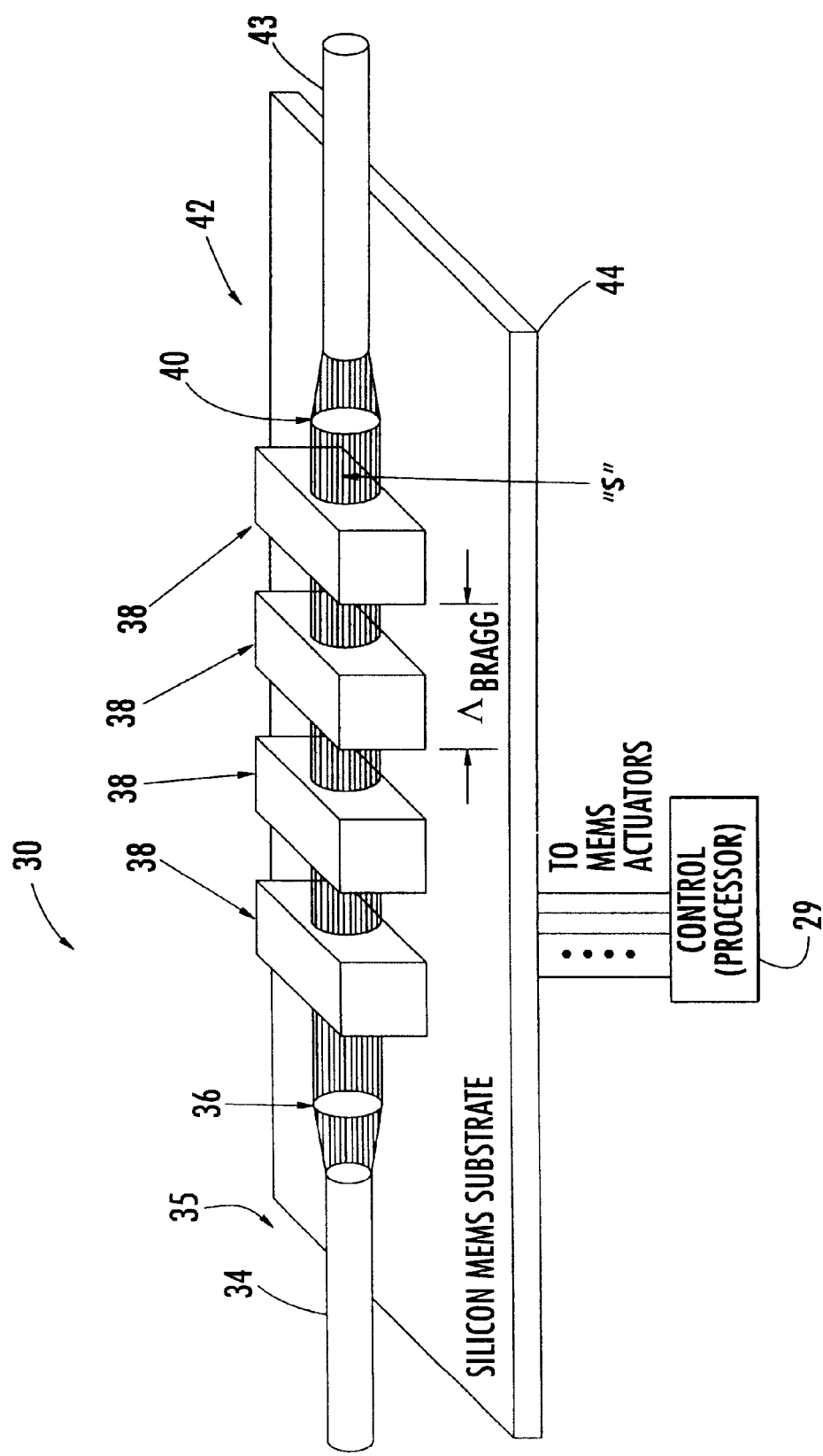
FIG. 2 is an isometric view of a tunable optical grating of the present invention shown in the form of a Bragg grating.

Referring now to FIGS. 1 and 2, there is illustrated in FIG. 1 at 20 an add/drop multiplexer that incorporates tunable Bragg gratings 22a, 22b, such as shown in FIG. 2. As illustrated, the tunable optical gratings 22a, 22b, in accordance with the invention, are placed in the optical transmission path 24 as part of an overall optical transmission system that uses optical circulators 26a, 26b. Amplifiers 28 can be placed at the input side 30 or output side 32 of the grating that forms part of the add/drop multiplexer 20. The gratings are formed as Bragg reflective gratings and set to reflect wavelengths that are dropped within the first circulator 26a and wavelengths that are added within the second circulator 26b. The amplifiers 28 can be used to adjust for any insertion losses in the add/drop and "through" pass. It is also possible to use different directional, optical couplers and optical isolators to provide selective add/drop capability, instead of use the described and illustrated optical circulators, as is known to those skilled in the art. A central processor 29, such as a processor as part of a personal computer, mini or mainframe, ASIC or other device known to those skilled in the art, controls the separator distance between grading structures (FIG. 2) by controlling individual MEMS actuators via control lines 29a.

FIG. 2 illustrates an isometric view of a tunable optical grating 30 of the present invention and having an optical waveguide 34 in the form of a single fiber optic forming an input port 35, which passes the optical signal, in the form of a wavelength division multiplexed signal through a collimating lens 36. The collimated signals then passes through a plurality of grating structures 38 formed as a Bragg grating (illustrated as a non-limiting example of four grating structures forming a Bragg grating) and into a converging lens 40. The optical signal passes through an output port 42 defined by another optical waveguide in the form of a single fiber optic.

In one aspect of the present invention, the grating structures 38 are formed to be moveable on a silicon MEMS substrate 44 having formed MEMS actuators, and can be tuned such that the separation distance between the Bragg grating structures can be changed to tune the Bragg grating to a desired Bragg wavelength selectivity as shown by the $\lambda_{BRAGG}$. The grating structures 38 can be formed by semiconductor and photolithographic techniques known to those skilled in the art, and attached to MEMS actuators, such that the grating structures are moveable with MEMS actuator movement.

Figure 3:
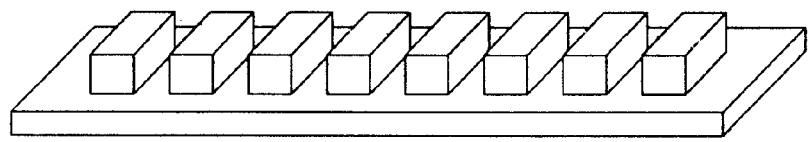
FIGS. 3, 4, 5 and 6 show multiple configurations possible with a single, tunable optical grating of the present invention, and showing a respective periodic, chirped, DFB, and Fabry-Perot Etalon grating.
Figure 4:
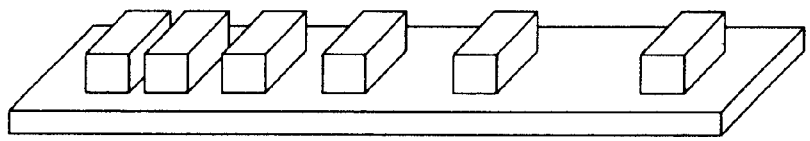
Figure 5:
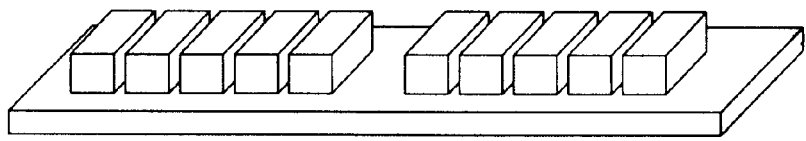

Referring now to FIGS. 3–6, there are illustrated four different types of gratings, which can be defined as a single device as shown in FIG. 2 where the separation distance between individual grating structures has been changed. FIG. 3 illustrates a simple periodic grating where the distance between grating structures is about the same. FIG. 4 illustrates a chirped grating where the gratings are progressively a greater distance from each other as light would pass from left to right. FIG. 5 illustrates a distributed feedback grating showing a separation between two groups of left and right gratings.

Figure 6:
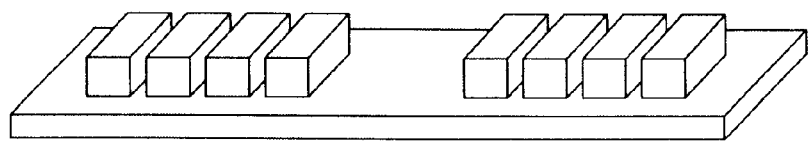

FIG. 6 shows a Fabry-Perot Etalon showing a large gap between two sets of gratings as is common in a Fabry-Perot Etalong grating structure.

Figure 8:
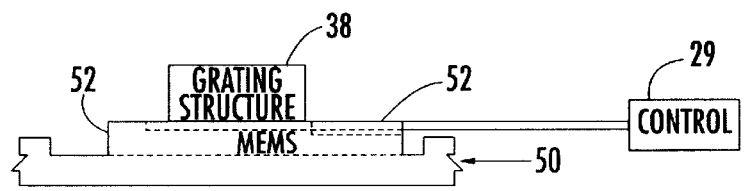
FIGS. 8, 9 and 10 are examples of different microelectromechanical (MEMS) actuators that can be used in the present invention.
Figure 9:
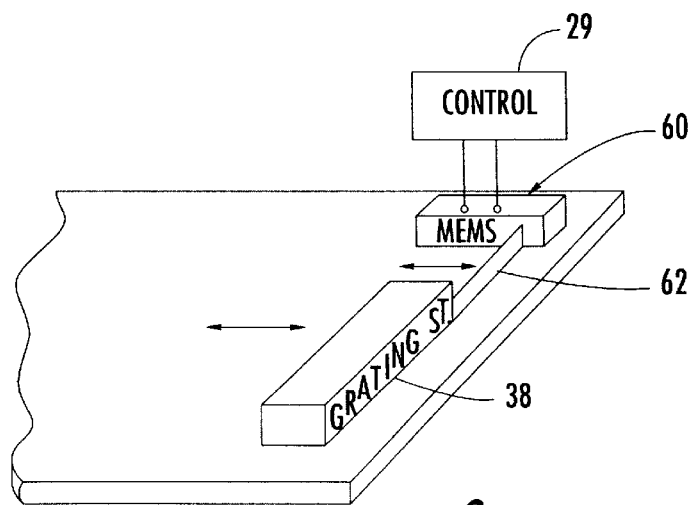
Figure 10:
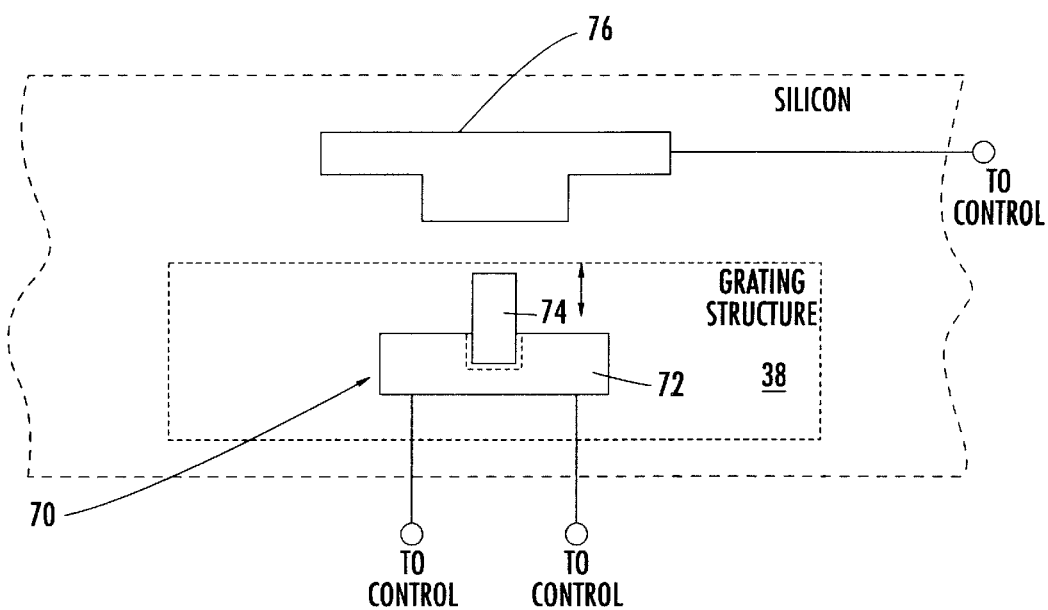

FIGS. 8–10 illustrate various types of microelectromechanical (MEMS) actuators that can be used for changing the separation distance between the various Bragg grating structures 38 in accordance with the present invention. Although the illustrated MEMS actuators show different types of movements for MEMS actuators, it should be understood that many different types of MEMS actuators can be used as suggested by those skilled in the art. The illustrated actuators are non-limiting examples for purposes of illustration.

FIG. 8 illustrates a flat, single layer silicon member 50 that can be defined for an actuator structure. As is well known to those skilled in the art, silicon has a relatively high Young's modulus, e.g., about 139 to 190 GPa, allowing some actuator deflection capability. For example, for a 50 micrometer (UM) deflection, a 5 mm by 5 mm by 50 micrometer single layer silicon membrane can be used. The silicon membrane 50 is defined during its processing to have a bellows/lever MEMS structure 52. The bellows/lever structure can be manufactured by MEMS fabrication techniques known to those skilled in the art to form an actuator that moves the grating structures a predetermined distance based on inputs received from a controller 29. The movement can even be on the order of a few nanometers. As a bellows moves, it could slide a lever or other interconnecting member and move the grating structure to which it is connected a predefined distance to form a grating, such as illustrated in FIGS. 3–6.

FIG. 9 illustrates in block format a hinged-plate actuator 60 where a linkage 62 mechanically links and interconnects the hinged plate actuator 60 to a grating structure 38. The actuator 60 imparts an in-plane motion to the linkage 62 to form a horizontal, back-and-forth reciprocating motion that moves the grating structure 38 into a desired position. The actuator could be formed by two vertically oriented electrodes where one of the electrodes is moveable and the other electrode is fixed, as known to those skilled in the art. Voltage can be applied across the electrodes by a controlled voltage source and the moveable electrode would move or swing toward the fixed electrode. This horizontal displacement of the moveable electrode is transferred by linkage to the grating structure where it is then positioned into a desired location.

It is also possible to use a MEMS deflectable beam member 70, as shown in FIG. 10, using a silicon, glass or quartz material, as known to those skilled in the art. The MEMS actuator can include an anchor 72 and bar member 74 slidably or otherwise operatively connected relative to the anchor and biased by an electrostatic charge that works in conjunction with a MEMS electrode 76, as known to those skilled in the art.

It is possible to form these and other MEMS actuators by techniques known to those skilled in the art, including standard photolithographic techniques. These techniques can include deep ion reactive etching of various channels and holes, and the deposition of various thermal oxide films, photolithography techniques, including photoresist application, and plasma etching.

Figure 7:
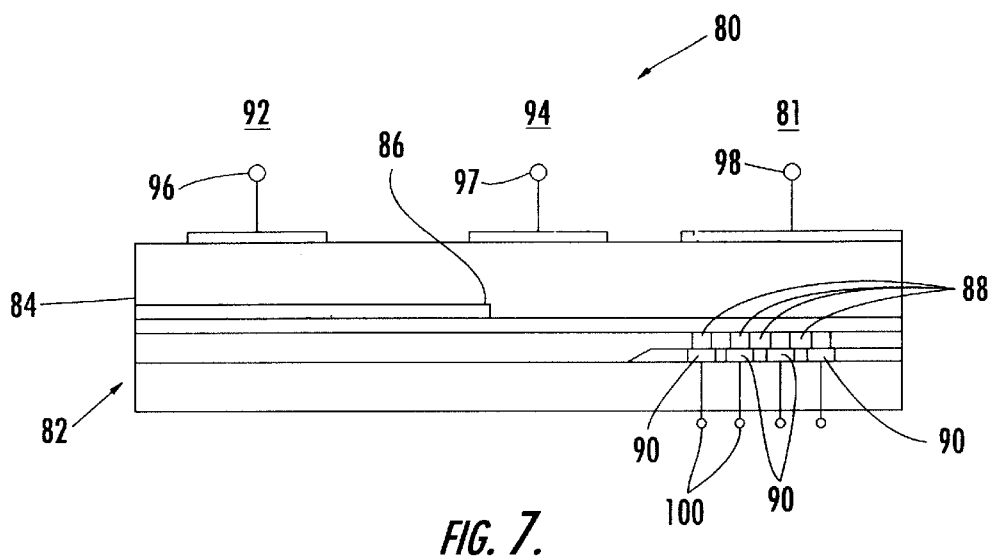
FIG. 7 is a schematic view of a tunable laser and filter apparatus of the present invention using a tunable Bragg grating.

FIG. 7 illustrates another aspect of the present invention for a semiconducting tunable laser and filter apparatus 80 where reflection occurs at a Bragg wavelength, as known to those skilled in the art. If a semiconducting polymer distributed feedback (DFB) laser is used, then the reflectors occur at the Bragg wavelength: $\lambda_{BRAGG}=2n_{eff}\Lambda$, where $n_{eff}$ is the effective refractive index. FIG. 7 illustrates the use of a distributed Bragg grating region 81. The gratings can provide high reflectivity and wavelength selectivity. This tunable laser and filter apparatus can include a semiconductor substrate 82 and a laser structure 84 formed on the substrate. This laser structure includes an active layer 86, as known to those skilled in the art, and in accordance with the present invention, a plurality of Bragg grating structures 88 are formed along the active layer to form a Bragg grating and provide optical reflections at a desired Bragg wavelength. A microelectromechanical (MEMS) actuator 90 is operatively connected to each Bragg grating structure for changing the separation between Bragg grating structures and tuning the Bragg grating to a desired wavelength selectivity and limiting the laser output to a selected narrowband mode. The apparatus can include an optical gain region 92 and also a phase adjust region 94 that are each selectively controlled via electrodes 96, 97. An electrode 98 also connects to the distributed Bragg grating 81. Electrodes 100 control the MEMS actuator.

As is known to those skilled in the art, a surface emitting semiconductor laser of the type described can operate at high power levels and with high efficiency and can form a single far-field lobe in a single mode. The distributed feedback grating in the form of the Bragg grating is formed of periodically alternating grating elements to provide the optical feedback as a second order grating. Passive distributed Bragg reflection gratings can be formed adjacent the distributed feedback grating and provide near-field uniformity while maintaining high efficiency. The MEMS actuator for respective grating structures can be formed by standard photolithographic techniques as known to those skilled in the art.

The distributed feedback laser applications are becoming more commonplace in the more advanced telecommunications systems and the use of dense wavelength division multiplexing (DWDM), allowing efficient combination of multi-channel (multi-carrier frequencies), and high-bit rate signals onto one optical fiber. The laser sources typically operate at 1310 nanometer and 1550 nanometer to transmit digital information at very high rates, even higher than 2.5 gigabits each second. The lasers emit light in the multi-longitudinal mode and the narrow band wavelengths cluster about a center wavelength. The interference between the different wavelengths limits the number of channels that can be transmitted along an optical fiber. The distributed feedback lasers use the grating within the laser medium as illustrated to act as a filter to limit the laser output to a single narrow-band mode required for long haul and high speed telecommunications.

The tunable optical grating of the present invention has special applicability to tuning Bragg gratings and can be used in optical dispersion compensation and broadband optical beam forming for phased array antennas, as an example. Other uses of the tuned grating, in accordance with the present invention, could include an optical amplifier gain spectrum flattening. It could also include adaptive optical equalization and reconfigurable optical add/drop multiplexing as illustrated in FIG. 1 and in other examples as known to those skilled in the art. It could be used with channel simulation and optical sensors, as well as tunable optical bandpass and band stop filters. It can also be used with active temperature compensation of DFB devices. These are all areas of technology known to those skilled in the art and the MEMS technology is especially applicable for these systems.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A tunable optical grating comprising:

a plurality of optical grating structures contained within an optical transmission path; and a substantially planar microelectromechanical (MEMS) substrate on which the grating structures are formed and slidably moveable thereon and having a controllable microelectromechanical (MEMS) actuator operatively connected to a respective grating structure such that a respective actuator is operatively connected to a respective grating structure for physically moving by sliding a grating structure relative to the MEMS substrate in a controlled manner and relative to an adjacent grating structure for changing the separation distance between grating structures and tuning the optical grating to a desired wavelength selectivity and permitting multiple configurations.

2. A tunable optical grating according to claim 1, wherein said grating structures form a periodic grating.

3. A tunable optical grating according to claim 1, wherein said grating structures form a chirped grating.

4. A tunable optical grating according to claim 1, wherein said grating structures form a distributed feedback grating.

5. A tunable optical grating according to claim 1, wherein said grating structures form a Fabry-Perot Etalon add/drop grating structure.

6. A tunable optical grating according to claim 1, wherein said MEMS actuator is photolithographically formed on said MEMS substrate.

7. A tunable optical grating according to claim 1, wherein said MEMS actuator comprises a flat, single layer silicon membrane structure.

8. A tunable optical grating according to claim 1, wherein said MEMS actuator comprises at least one anchor support and an arm member operatively connected to a grating structure and supported by the anchor support and movable therewith for physically moving said grating structure relative to another grating structure.

9. A tunable optical grating according to claim 1, wherein said MEMS actuator comprises a hinged plate actuator operatively connected to each grating structure.

10. A tunable optical grating according to claim 1, and further comprising an optical waveguide defining an input port through which an optical signal passes through said grating structures and an optical waveguide defining an output port for receiving the optical signal from the grating structures.

11. A tunable optical grating structure according to claim 10, and further comprising a collimating lens operatively connected to said input port and a converging lens operatively connected to said output port.

12. A tunable optical add/drop network element comprising:
    an input port for receiving a multi-wavelength optical signal and passing the optical signal along an optical transmission path;
    an output port for receiving the optical signal from the optical transmission path and passing the multi-wavelength optical signal with added or dropped optical signal channel components;
    an optical add/drop element contained within the optical transmission path, said optical add/drop element comprising;
        a plurality of Bragg grating structures contained within the optical transmission path and forming a Bragg grating for receiving the optical signal and passing and/or reflecting optical signal channel components of desired wavelength; and
        a substantially planar microelectromechanical (MEMS) substrate on which the Bragg grating structures are formed and slidably moveable thereon, and having controllable microelectromechanical (MEMS) actuators operatively connected to respective Bragg grating structures such that a respective actuator is operatively connected to a respective Bragg grating structure for physically moving by sliding a grating structure relative to the MEMS substrate and adjacent Bragg grating structure in a controlled manner for changing the separation distance between Bragg grating structures and tuning the optical add/drop element to a desired wavelength selectivity and permitting multiple configurations.

13. A network element according to claim 12, and further comprising add and drop ports operatively connected to said optical add/drop element, wherein optical signal channel components of desired wavelength are added and dropped.

14. A network element according to claim 12, wherein said plurality of Bragg grating structures are configurable to be responsive to different optical signal channel components.

15. A network element according to claim 12, and further comprising a silicon MEMS substrate on which said Bragg grating structures are formed, said MEMS substrate having formed actuators such that a respective actuator is operatively connected to a respective Bragg grating structure.

16. A network element according to claim 15, wherein said MEMS actuator is photolithographically formed on said MEMS substrate.

17. A network element according to claim 12, wherein said MEMS actuator comprises a flat, single layer silicon membrane structure.

18. A network element according to claim 12, wherein said MEMS actuator comprises at least one anchor support and an arm member operatively connected to a Bragg grating structure and supported by the anchor support and movable therewith for moving said Bragg grating structure relative to another Bragg grating structure.

19. A network element according to claim 12, wherein said MEMS actuator comprises a hinged plate actuator operatively connected to each Bragg grating structure.

20. A tunable laser and filter apparatus comprising;
    a semiconductor substrate;
    a laser structure formed on the semiconductor substrate and further comprising an active layer and a MEMS substrate and plurality of Bragg grating structures formed along the active layer on the MEMS substrate and slidably moveable thereon to form a Bragg grating and provide optical reflections at a desired Bragg wavelength; and
    microelectromechanical (MEMS) actuators formed at the MEMS substrate and operatively connected to respective Bragg grating structures such that respective actuators are operatively connected to respective Bragg gratings for physically moving by sliding a Bragg grating structure relative to the MEMS substrate in a controlled manner and relative to an adjacent grating structure and changing the separation distance between Bragg grating structures and tuning the Bragg grating structure to a desired wavelength selectivity and limiting the laser output to a selected narrow-band mode.

21. An apparatus according to claim 20, wherein said laser structure comprises a distributed feedback laser.

22. An apparatus according to claim 20, wherein said active layer includes a quantum well structure.

23. An apparatus according to claim 20, wherein said MEMS actuator is photolithographically formed on said MEMS substrate.

24. An apparatus according to claim 20, wherein said MEMS actuator comprises a flat, single layer silicon membrane structure.

25. An apparatus according to claim 20, wherein said MEMS actuator comprises at least one anchor support and an arm member operatively connected to a Bragg grating structure and supported by the anchor support and movable therewith for moving said Bragg grating structure relative to another Bragg grating structure.

26. An apparatus according to claim 20, wherein said MEMS actuator comprises a hinged plate actuator operatively connected to each Bragg grating structure.

* * * * *